US010302357B2

(12) United States Patent
Hernandez et al.

(10) Patent No.: US 10,302,357 B2
(45) Date of Patent: May 28, 2019

(54) PROCESS AND APPARATUS FOR THE PRODUCTION OF CO AND $CO_2$

(71) Applicant: L'Air Liquide, Societe Anonyme pour l'Etude et l'Exploitation des Procedes Georges Claude, Paris (FR)

(72) Inventors: Antoine Hernandez, La Queue en Brie (FR); Paul Terrien, Paris (FR)

(73) Assignee: L'Air Liquide, Societe Anonyme pour l'Etude et l'Exploitation des Procedes Georges Claude, Paris (FR)

(*) Notice: Subject to any disclaimer, the term of this patent is extended or adjusted under 35 U.S.C. 154(b) by 421 days.

(21) Appl. No.: 15/037,510

(22) PCT Filed: Nov. 19, 2014

(86) PCT No.: PCT/EP2014/075024
§ 371 (c)(1),
(2) Date: May 18, 2016

(87) PCT Pub. No.: WO2015/075071
PCT Pub. Date: May 28, 2015

(65) Prior Publication Data
US 2016/0282044 A1    Sep. 29, 2016

(30) Foreign Application Priority Data
Nov. 19, 2013 (EP) .................. 13306581

(51) Int. Cl.
F25J 3/02 (2006.01)
C01B 3/50 (2006.01)
(Continued)

(52) U.S. Cl.
CPC ............ F25J 3/0665 (2013.01); C01B 3/501 (2013.01); C01B 3/506 (2013.01); C01B 3/56 (2013.01);
(Continued)

(58) Field of Classification Search
CPC ...... B01D 53/047; Y02C 10/10; Y02P 20/152; Y02P 30/30; C01B 3/501; C01B 3/506;
(Continued)

(56) References Cited

U.S. PATENT DOCUMENTS 4,732,596 A * 3/1988 Nicholas ............ B01D 53/047
62/626
4,861,351 A    8/1989 Nicholas et al.
(Continued)

FOREIGN PATENT DOCUMENTS

DE    10 2011 008931    7/2012
EP    0 979 982    2/2000
WO    WO 2012/064938    5/2012

OTHER PUBLICATIONS

International Search Report and Written Opinion for PCT/EP2014/075024, dated Jan. 28, 2015.
(Continued)

Primary Examiner — Frank M Lawrence, Jr.
(74) Attorney, Agent, or Firm — Justin K. Murray

(57) ABSTRACT

A process to produce at least carbon dioxide and carbon monoxide from a feed gas containing carbon dioxide, hydrogen and carbon monoxide; comprises separating at least part of the carbon dioxide from the compressed feed gas by partial condensation and/or distillation producing a carbon dioxide product and a carbon dioxide depleted stream, treating the carbon dioxide depleted stream in a treatment unit to produce a feed stream containing carbon monoxide and hydrogen, less rich in carbon dioxide than the carbon dioxide depleted stream and feeding at least part of the feed stream containing carbon monoxide and hydrogen to a separation unit operating at cryogenic temperatures to produce a carbon monoxide product.

12 Claims, 2 Drawing Sheets

(51) Int. Cl.
*F25J 3/06* (2006.01)
*C01B 3/56* (2006.01)
*C01B 32/40* (2017.01)
*C01B 32/50* (2017.01)

(52) U.S. Cl.
CPC ............ *C01B 32/40* (2017.08); *C01B 32/50* (2017.08); *F25J 3/0223* (2013.01); *F25J 3/0233* (2013.01); *F25J 3/0252* (2013.01); *F25J 3/0261* (2013.01); *F25J 3/0266* (2013.01); *F25J 3/067* (2013.01); *F25J 3/0625* (2013.01); *F25J 3/0635* (2013.01); *F25J 3/0655* (2013.01); C01B 2203/0233 (2013.01); C01B 2203/0283 (2013.01); C01B 2203/042 (2013.01); C01B 2203/043 (2013.01); C01B 2203/0405 (2013.01); C01B 2203/046 (2013.01); C01B 2203/047 (2013.01); C01B 2203/0415 (2013.01); C01B 2203/0475 (2013.01); C01B 2203/147 (2013.01); C01B 2203/86 (2013.01); F25J 2205/40 (2013.01); F25J 2205/50 (2013.01); F25J 2205/60 (2013.01); F25J 2205/80 (2013.01); F25J 2245/02 (2013.01); Y02C 10/12 (2013.01); Y02P 20/152 (2015.11); Y02P 30/30 (2015.11)

(58) Field of Classification Search
CPC ............ C01B 3/56; C01B 2203/0233; C01B 2203/0283; C01B 2203/0405; C01B 2203/0415; C01B 2203/042; C01B 2203/043; C01B 2203/046; C01B 2203/047; C01B 2203/0475; C01B 2203/147; C01B 2203/86; F25J 3/0223; F25J 3/0233; F25J 3/0252; F25J 3/0261; F25J 3/0266; F25J 3/0625; F25J 3/0645; F25J 3/0655; F25J 3/0665; F25J 3/067; F25J 2205/40; F25J 2205/50; F25J 2205/60; F25J 2205/80; F25J 2245/02
USPC ................. 95/96, 139; 96/108, 121, 134
See application file for complete search history.

(56) References Cited

U.S. PATENT DOCUMENTS

| | | | |
|---|---|---|---|
| 6,192,706 B1* | 2/2001 | Bergman, Jr. | F25J 3/0223 62/624 |
| 6,289,693 B1* | 9/2001 | O'Brien | B01D 53/229 62/624 |
| 2008/0173585 A1* | 7/2008 | White | B01D 53/002 210/656 |
| 2011/0296868 A1 | 12/2011 | Lockwood et al. | |
| 2012/0090353 A1* | 4/2012 | Chen | B01D 53/0473 62/617 |
| 2012/0121497 A1 | 5/2012 | Terrien et al. | |
| 2012/0241678 A1* | 9/2012 | Valentin | B01D 53/047 252/373 |
| 2015/0323248 A1* | 11/2015 | Terrien | C01B 3/36 252/373 |

OTHER PUBLICATIONS

Bierhals, et al., "Carbon Monoxide," Ullmann's Encyclopedia of Industrial Chemistry, Mar. 15, 2001, pp. 685-686.
Higman, et al., "Gasification," Elsevier, Jan. 15, 2003, p. 20.

* cited by examiner

PROCESS AND APPARATUS FOR THE PRODUCTION OF CO AND $CO_2$

CROSS REFERENCE TO RELATED APPLICATIONS

This application is a § 371 of International PCT Application PCT/EP2014/075024, filed Nov. 19, 2014, which claims the benefit of EP13306581, filed Nov. 19, 2013, both of which are herein incorporated by reference in their entireties.

TECHNICAL FIELD OF THE INVENTION

The present invention relates to a process and apparatus for the production of CO and CO2.

By "production of CO", the production of a liquid or gaseous stream containing at least 40% mol. or at least 60%, or at least 90% carbon monoxide should be understood. The stream may contain at most 60% mol. hydrogen or at least 50% mol. hydrogen.

By "production of CO2", the production of a liquid or gaseous stream containing at least 60% mol. carbon dioxide should be understood.

BACKGROUND OF THE INVENTION

Steam Methane Reforming plants have the ability to produce pure hydrogen, as well as CO or combinations or mixtures thereof. For environmental reasons or other economical drivers, it is becoming more and more important in new projects to include plans to be capture-ready and include a CO2 capture solution. This is also the case for hydrogen production plants such as SMR plants.

US-A-2012/0121497A describes a solution for efficient capture of CO2 from an SMR plant:
  Use of a High Temperature shift followed by a Low Temperature Shift
  Separation of the shifted syngas through a Pressure Swing Adsorption (PSA)
  Compression of the PSA off-gas
  Separation of CO2 through a sub ambient temperature purification unit (CPU)
  Use of two sets of membranes to recycle part of the hydrogen to the PSA and part of the CO2 to the cryogenic purification unit Separation in a PSA to remove hydrogen followed by compression and subambiant temperature separation is described in EP-A-1869385.

Traditionally, when a CO co-production is required in a project, CO is produced from the synthesis gas before the high temperature shift, as described in U.S. Pat. No. 4,861,351. In a case with CO production and CO2 capture, the obvious solution would be to have one part of the syngas treated before shift by the CO cold box and the other part treated through two sets of shifts (HT Shift followed by LT Shift) and to have the CPU located on the PSA off gas.

SUMMARY OF THE INVENTION

In certain embodiments, this invention relates to a simplified and optimized process to produce CO and CO2 from a source such as a hydrogen production plant or other suitable sources, such as a blast furnace.

In one embodiment, the location of the CO production in the system is fundamentally changed in a case including CO2 capture, by producing CO from the CO2 depleted gas of the CPU or possibly from the residue of the membrane used to separate the CO2 depleted gas of the CPU. One example of a process, according to the invention, would consist in:
  Compression of a feed gas containing hydrogen, carbon dioxide and carbon monoxide the PSA off-gas
  Separation of CO2 through a cryogenic purification unit (CPU)
  Treatment of the CO2 depleted gas of the CPU to produce a feed gas containing carbon monoxide and hydrogen and possibly methane as main components
  Cryogenic separation of the feed gas to produce carbon monoxide.

One option for the treatment of the CO2 depleted gas is:
  Use of two sets of membranes to recycle part of the hydrogen to the PSA and part of the CO2 to the cryogenic purification unit
  Treatment of the residue of the second membrane to produce the feed gas for the cryogenic separation (typically amines absorption system to remove CO2, possibly followed by adsorption system any remaining CO2)

The feed gas may be produced by: use of a High Temperature Shift, followed by separation of the shifted syngas through a Pressure Swing Adsorption (PSA) to form the feed gas which is the PSA tail gas and a hydrogen rich product.

In this case, the inlet temperature of the HT shift can be adjusted virtually to keep exactly the amount of CO production needed in the CO cold box.

This process provides an optimized integration of the CO and the CO2 production. In particular it reduces notably the size of the CO cryogenic separation plant because of significantly increased CO content at the inlet.

Economical analysis shows large associated savings, mostly in terms of investment. Typically 5-10% reduction of the total investment for CO2 capture and CO production can be expected.

According to one object of the invention, there is provided a process to produce at least carbon dioxide and carbon monoxide from a feed gas containing carbon dioxide, hydrogen and carbon monoxide; comprising at least the following steps:
  a) Compressing the feed gas to a pressure higher than 25 bar abs,
  b) Separating at least part of the carbon dioxide from the compressed feed gas by partial condensation and/or distillation producing a carbon dioxide product and a carbon dioxide depleted stream,
  c) Treating the carbon dioxide depleted stream in a treatment unit to produce a feed stream containing carbon monoxide and hydrogen, less rich in carbon dioxide than the carbon dioxide depleted stream, said feed stream containing less than 30% carbon dioxide and
  d) Feeding at least part of the feed stream containing carbon monoxide and hydrogen to a separation unit operating at cryogenic temperatures to produce a carbon monoxide product.
  Optional features include:
  the carbon monoxide product contains at least 40% mol carbon monoxide or at least at least 60%, or at least 90% carbon monoxide
  the carbon monoxide product is liquid or gaseous
  the carbon monoxide product may contain at most 60% mol. hydrogen or at most 50% mol. hydrogen.
  the carbon dioxide product is liquid or gaseous
  the carbon dioxide product contains at least 60% mol. carbon dioxide the feed gas is a tail gas from a pressure swing adsorption unit producing a hydrogen rich product.

the separation unit produces a stream containing hydrogen as well as the feed stream and the stream containing hydrogen is sent to the inlet of the pressure swing adsorption unit.

the feed gas is derived from a synthesis gas obtained from a steam methane reforming plant, a partial oxidation plant or a coke gas plant.

the feed gas is derived from the synthesis gas first by a shift reaction to convert carbon monoxide to carbon dioxide and then by separation in the pressure swing adsorption unit.

the treatment unit includes a permeation unit for separating the carbon dioxide depleted stream to reduce its carbon dioxide content and produce the feed stream containing carbon monoxide and hydrogen or a stream from which the feed stream is derived.

the step c) comprises at least two different permeation steps in series.

the residue of the first membrane step is treated through the second permeation step and the residue of the second permeation unit is the carbon monoxide depleted stream of step d).

the permeate of the first membrane step is recycled to the pressure swing adsorption unit.

the carbon dioxide depleted stream contains carbon dioxide and carbon monoxide, the treatment unit is used to reduce the carbon monoxide content of the carbon dioxide depleted stream, producing an intermediate stream and the treatment unit includes a further separation step in which the intermediate stream is treated by adsorption and/or absorption and/or permeation to produce the feed stream containing carbon monoxide and hydrogen and a carbon dioxide enriched stream.

the carbon dioxide enriched stream is sent to the separation step of step b) to be separated the separation unit of step d) is a partial condensation unit, a methane wash unit or a carbon monoxide wash unit.

the process comprises the step of reducing the CO2 content of the feed stream prior to step d) to below 1%, or even below 0.0099%.

the reduction of the CO2 content to below 1% or 0.0099% is carried out by adsorption or by amine washing the process comprises the step of reducing the CO2 content of the feed stream prior to step d) to a level acceptable for separation at cryogenic temperatures According to another object of the invention, there is provided an apparatus to produce at least carbon dioxide and carbon monoxide from a feed gas containing carbon dioxide, hydrogen and carbon monoxide; comprising: means for separating at least part of the carbon dioxide from the feed gas at a pressure higher than 25 bar abs by partial condensation and/or distillation producing a carbon dioxide product and a carbon dioxide depleted stream, a treatment unit for treating the carbon dioxide depleted stream to produce a feed stream containing carbon monoxide and hydrogen, less rich in carbon dioxide than the carbon dioxide depleted stream, a separation unit capable of operating at cryogenic temperatures by distillation and/or stripping and/or partial condensation, a conduit for feeding at least part of the feed stream containing carbon monoxide and hydrogen to the separation unit and a conduit for removing a carbon monoxide product from the separation unit.

The apparatus may additionally comprise:

a pressure swing adsorption unit producing a hydrogen rich product and wherein the feed gas is a tail gas from the pressure swing adsorption unit.

a conduit for removing a stream containing hydrogen from the separation unit and a conduit for sending the stream containing hydrogen to the inlet of the pressure swing adsorption unit.

means for deriving the feed gas from a synthesis gas obtained from a steam methane reforming plant, a partial oxidation plant or a coke gas plant.

means for deriving the feed gas from the synthesis gas comprising a shift reaction treatment unit to convert carbon monoxide to carbon dioxide and upstream of a pressure swing adsorption unit.

the treatment unit includes a permeation unit for separating the carbon dioxide depleted stream to reduce its carbon dioxide content and produce the feed stream containing carbon monoxide and hydrogen or a stream from which the feed stream is derived.

the apparatus comprises a pre-treatment unit for reducing the carbon dioxide level in the feed stream preferably to a level acceptable for subsequent separation at cryogenic temperatures Where the carbon dioxide depleted stream contains carbon dioxide and carbon monoxide, the treatment unit may be capable of reducing the carbon monoxide content of the carbon dioxide depleted stream, producing an intermediate stream and the treatment unit includes a further separation unit in which the intermediate stream is treated by adsorption and/or absorption and/or permeation to produce the feed stream containing carbon monoxide and hydrogen and a carbon dioxide enriched stream.

The separation unit capable of operating at cryogenic temperatures may be a partial condensation unit, a methane wash unit or a carbon monoxide wash unit.

The feed gas is preferably obtained as the off-gas of a pressure swing adsorption unit. This pressure swing adsorption unit typically produces hydrogen as a first product, at elevated pressure.

The overall process therefore produces at least two products in the following order:

Carbon Dioxide

Carbon Monoxide

It may produce three products in the following order:

Hydrogen

Carbon dioxide

Carbon monoxide

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

The process will be described in greater detail with reference to the figures which shows processes according to the invention.

Figure 1:
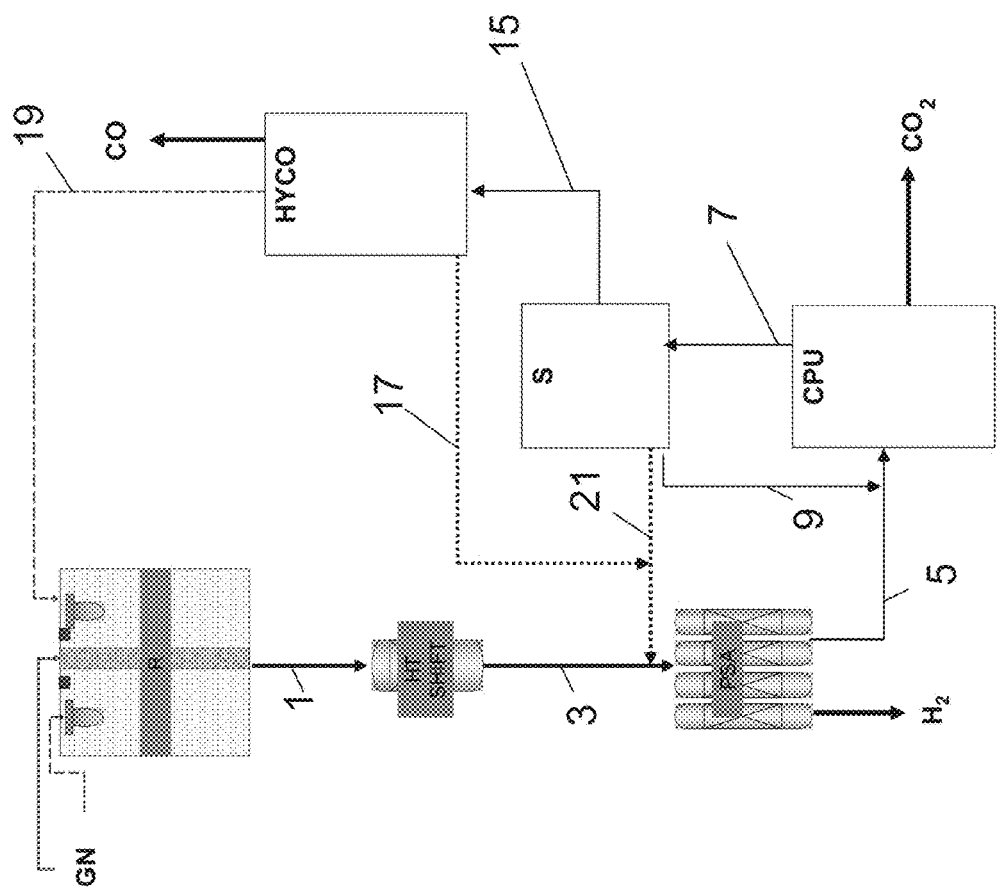
FIG. 1 represents a process flow diagram in accordance with an embodiment of the present invention.

In FIG. 1 natural gas GN is fed to the burners of synthesis gas generator R to process synthesis gas 1 containing hydrogen, carbon monoxide and carbon dioxide. After shift conversion, the shifted gas 3 is separated in a PSA unit to produce a product rich in hydrogen and a residual gas 5 containing carbon dioxide, carbon monoxide and hydrogen, the hydrogen content of gas 5 being less than that of gas 3.

The residual gas 5 is compressed to a pressure higher than 25 bar abs and separated in a CPU at a subambient temperature by partial condensation and/or distillation producing a carbon dioxide product and a carbon dioxide depleted stream. The carbon dioxide depleted stream 7 is treated in a treatment unit S to produce a feed stream 15 containing principally carbon monoxide and hydrogen and preferably less than 1%, or even less than 0.0099% carbon dioxide. Stream 15 is sent to a separation unit HYCO operating at cryogenic temperature by partial condensation and/or distillation to produce a stream containing at least 40% carbon monoxide, at least 60% carbon monoxide or at least 90% carbon monoxide. The stream may for example contain at least 40% carbon monoxide and less than 60% hydrogen.

The treatment unit S may also produce a stream 21 and/or a stream 9 containing carbon dioxide, preferably containing at least carbon dioxide.

In the figure, stream 21 is sent upstream of the PSA unit and stream 9 is sent upstream of the CPU unit.

The separation unit HYCO may also produce a stream 19 containing methane which is sent back to the synthesis gas generator as fuel. The separation unit HYCO may also produce a stream 17 rich in hydrogen, containing at least 50% hydrogen. This stream is sent upstream of the hydrogen PSA.

Figure 2:
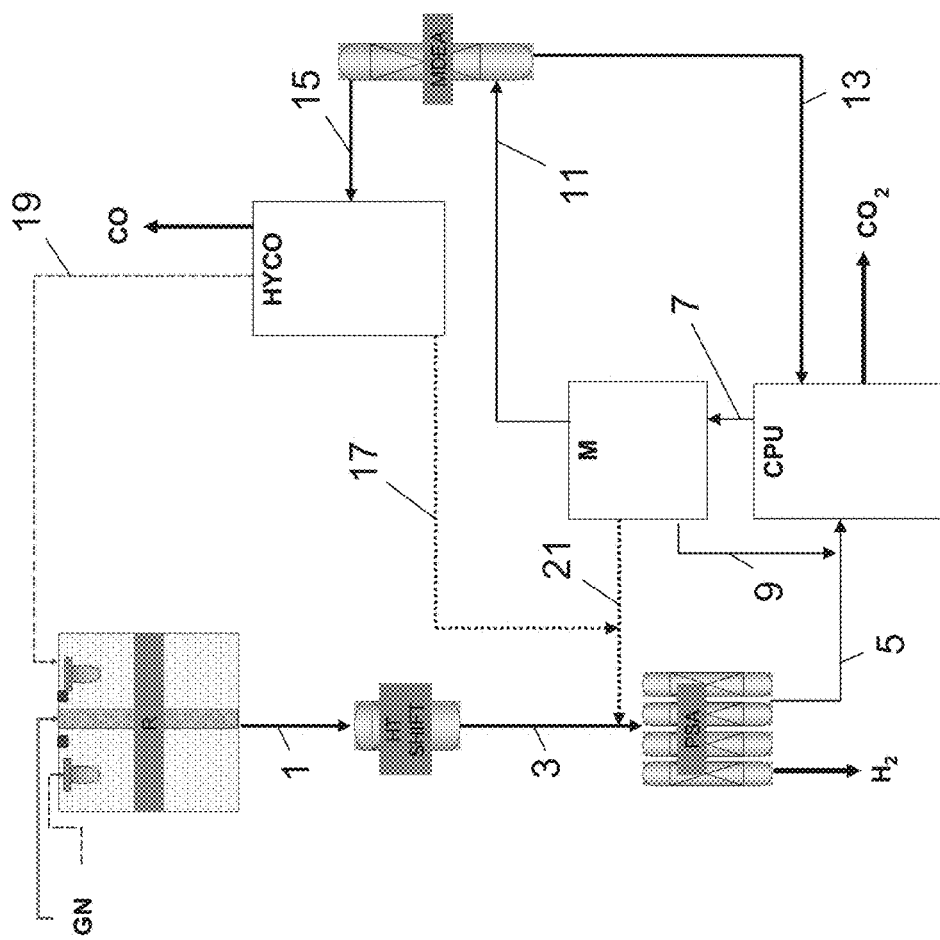
FIG. 2 represents a process flow diagram in accordance with an embodiment of the present invention.

To illustrate the contents of treatment unit 7, FIG. 2 shows the case where the unit T is composed of a permeation unit M upstream of an absorption unit MDEA, in which an amine wash takes place.

Here the stream 7 depleted in carbon dioxide is separated using the permeation unit M to form a stream 11 still further reduced in carbon dioxide and enriched in methane and carbon monoxide.

Stream 11 is sent to the amine wash MDEA to produce feed steam 15 containing principally methane, hydrogen and carbon monoxide.

Feed stream 15 is separated in a cryogenic separation unit HYCO for example by a partial condensation process. The use of a methane wash process or a carbon monoxide wash process is also a possibility.

This produces a carbon monoxide rich stream containing at least 40% carbon monoxide, a methane enriched stream 19 which is sent back to the synthesis gas generator as fuel and a hydrogen rich stream 17 which is sent upstream of the PSA unit.

The carbon dioxide enriched stream 13 produced by the amine wash is sent to the CPU.

The table below shows molar percentage purities for the streams of FIG. 2.

|  | PSA off-gas 5 | Inlet stream 7 to membrane unit M | Residue stream 11 from membrane unit M | Stream 15 feeding HYCO unit after CO2 removal |
| --- | --- | --- | --- | --- |
| CO2 | 46.5% | 16.2% | 8.2% | 0.0% |
| Methane | 10.1% | 14.4% | 32.8% | 35.8% |
| Hydrogen | 25.1% | 43.4% | 10.1% | 11.0% |
| CO | 16.2% | 24.0% | 44.7% | 48.8% |
| H2O | 0.7% | 0.0% | 0.0% | 0.0% |
| Nitrogen | 1.4% | 2.0% | 4.1% | 4.4% |

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A process to produce at least carbon dioxide and carbon monoxide from a feed gas containing carbon dioxide, hydrogen and carbon monoxide; the process comprising the steps of:
 a) compressing the feed gas to a pressure higher than 25 bar abs;
 b) separating at least part of the carbon dioxide from the compressed feed gas thereby producing a carbon dioxide product and a carbon dioxide depleted stream, wherein the separation is done using a technique selected from the group consisting of partial condensation, distillation, and combinations thereof;
 c) treating the carbon dioxide depleted stream in a treatment unit to produce a feed stream containing carbon monoxide and hydrogen, wherein the feed stream is less rich in carbon dioxide than the carbon dioxide depleted stream, said feed stream containing at least 30% mol of carbon monoxide; and d) feeding at least part of the feed stream containing carbon monoxide and hydrogen to a separation unit operating at cryogenic temperatures to produce a carbon monoxide product, wherein the feed gas is a tail gas from a pressure swing adsorption unit (PSA) producing a hydrogen rich product, wherein the treatment unit produces a hydrogen containing stream as well as the feed stream and the hydrogen containing stream is sent to the inlet of the pressure swing adsorption unit.

2. The process according to claim 1, wherein the feed gas is derived from a synthesis gas obtained from a syngas producing plant selected from the group consisting of steam methane reforming plant, a partial oxidation plant, a coke gas plant, and combinations thereof.

3. The process according to claim 2, wherein the feed gas is derived from the synthesis gas first by a shift reaction to convert carbon monoxide to carbon dioxide and then by separation in the pressure swing adsorption unit.

4. A process to produce at least carbon dioxide and carbon monoxide from a feed gas containing carbon dioxide, hydrogen and carbon monoxide; the process comprising the steps of:

a) compressing the feed gas to a pressure higher than 25 bar abs;

b) separating at least part of the carbon dioxide from the compressed feed gas thereby producing a carbon dioxide product and a carbon dioxide depleted stream, wherein the separation is done using a technique selected from the group consisting of partial condensation, distillation, and combinations thereof:

c) treating the carbon dioxide depleted stream in a treatment unit to produce a feed stream containing carbon monoxide and hydrogen, wherein the feed steam is less rich in carbon dioxide than the carbon dioxide depleted stream, said feed stream containing at least 30% mol of carbon monoxide, and d) feeding at least part of the feed stream containing carbon monoxide and hydrogen to a separation unit operating at cryogenic temperatures to produce a carbon monoxide product, wherein the treatment unit includes a permeation unit for separating the carbon dioxide depleted stream to reduce its carbon dioxide content and produce the feed stream containing carbon monoxide and hydrogen or a stream from which the feed stream is derived.

5. The process according to claim 4, wherein the step c) comprises at least two different permeation steps in series.

6. The process according to claim 5, wherein the residue of the first permeation step is treated through the second permeation step and the residue of the second permeation unit is the carbon monoxide depleted stream of step d).

7. The process according to claim 5, wherein the permeate of the first permeation step is recycled to the pressure swing adsorption unit.

8. A process to produce at least carbon dioxide and carbon monoxide from a feed gas containing carbon dioxide, hydrogen and carbon monoxide; the process comprising the steps of:

a) compressing the feed gas to pressure higher than 25 bar abs;

b) separating at least part of the carbon dioxide from the compressed feed gas thereby producing a carbon dioxide product and a carbon dioxide depleted stream wherein the separation is done using a technique selected from the group consisting of partial condensation, distillation, and combinations thereof:

c) treating the carbon dioxide depleted stream in a treatment unit to produce a feed stream containing carbon monoxide and hydrogen, wherein the feed stream is less rich in carbon dioxide than the carbon dioxide depleted stream, said feed stream containing at least 30% mol of carbon monoxide, and d) feeding at least part of the feed stream containing carbon monoxide and hydrogen to a separation unit operating at cryogenic temperatures to produce a carbon monoxide product, wherein the carbon dioxide depleted stream contains carbon dioxide and carbon monoxide, the treatment unit is used to reduce the carbon monoxide content of the carbon dioxide depleted stream, producing an intermediate stream and the treatment unit includes a further separation step in which the intermediate stream is treated by adsorption and/or absorption and/or permeation to produce the feed stream containing carbon monoxide and hydrogen and a carbon dioxide enriched stream.

9. A process according to claim 8, wherein the feed stream contains below 1% carbon dioxide.

10. A process according to claim 8, wherein the carbon dioxide enriched stream is sent to the separation step of step b) to be separated.

11. The process according to claim 1, wherein the separation unit of step d) is a partial condensation unit, a methane wash unit or a carbon monoxide wash unit.

12. An apparatus to produce at least carbon dioxide and carbon monoxide from a feed gas containing carbon dioxide, hydrogen and carbon monoxide; comprising:

means for separating at least part of the carbon dioxide from the feed gas at a pressure higher than 25 bar abs by partial condensation and/or distillation producing a carbon dioxide product and a carbon dioxide depleted stream;

a treatment unit configured to treat the carbon dioxide depleted stream to produce a feed stream containing carbon monoxide and a hydrogen containing stream wherein the feed stream is less rich in carbon dioxide than the carbon dioxide depleted stream;

a separation unit configured to operate at cryogenic temperatures by distillation and/or stripping and/or partial condensation;

a conduit for feeding at least part of the feed stream containing carbon monoxide and hydrogen from the treatment unit to the separation unit;

a conduit for removing a carbon monoxide product from the separation unit;

wherein the treatment unit is in fluid communication with a pressure swing adsorption (PSA) unit, such that the PSA unit is configured to receive the hydrogen containing stream from the treatment unit, wherein the PSA unit is in fluid communication with the means for separating at least part of the carbon dioxide from the feed gas, wherein the feed gas is a tail gas from a pressure swing adsorption unit (PSA) producing a hydrogen rich product.

* * * * *